US006860469B2

(12) United States Patent
Kerg et al.

(10) Patent No.: US 6,860,469 B2
(45) Date of Patent: Mar. 1, 2005

(54) ROTARY VALVE ACTUATOR

(75) Inventors: David C. Kerg, Fairview Park, OH (US); David Manacapelli, Medina, OH (US)

(73) Assignee: Swagelok Corporation, Solon, OH (US)

( * ) Notice: Subject to any disclaimer, the term of this patent is extended or adjusted under 35 U.S.C. 154(b) by 16 days.

(21) Appl. No.: 10/446,948

(22) Filed: May 28, 2003

(65) Prior Publication Data

US 2004/0036050 A1 Feb. 26, 2004

Related U.S. Application Data

(60) Provisional application No. 60/384,332, filed on May 30, 2002.

(51) Int. Cl.[7] .............................................. F16K 31/524
(52) U.S. Cl. ...................................... 251/263; 251/337
(58) Field of Search ................................. 251/263, 262, 251/337, 335.3, 331

(56) References Cited

U.S. PATENT DOCUMENTS

| | | | |
|---|---|---|---|
| 661,003 A | * 10/1900 | Stahl | ........................... 251/263 |
| 832,589 A | * 10/1906 | Brown | ........................ 251/263 |
| 1,172,900 A | 2/1916 | Payne | |
| 1,261,002 A | 4/1918 | Baas | |
| 1,464,562 A | 8/1923 | Cordley | |
| 1,589,696 A | 6/1926 | Holtz | |
| 1,722,401 A | 7/1929 | Todd | |
| 1,779,064 A | * 10/1930 | Gohring | ..................... 251/263 |
| 1,964,835 A | 7/1934 | Wheaton | |
| 2,201,095 A | 5/1940 | Kaufman | |
| 2,392,800 A | 1/1946 | Osburn | |
| 2,641,437 A | 6/1953 | Jay et al. | |
| 3,363,878 A | 1/1968 | Smith et al. | |
| 4,103,704 A | 8/1978 | Richards | |
| 4,580,596 A | 4/1986 | Stehling | |
| 5,294,093 A | 3/1994 | Huventeau et al. | |
| 5,551,477 A | 9/1996 | Kanno et al. | |
| 5,662,139 A | 9/1997 | Lish | |
| 5,771,924 A | 6/1998 | Huygen | |
| 6,595,240 B2 | 7/2003 | Leys et al. | |

* cited by examiner

*Primary Examiner*—John Bastianelli
(74) *Attorney, Agent, or Firm*—Calfee, Halter & Griswold LLP

(57) ABSTRACT

A rotary actuator for a valve includes a cam mechanism for transmitting opening force to a movable valve member to move the valve member off a valve seat, against the bias of a closing spring. The cam mechanism does not transmit spring force to the valve member when the valve member is being moved to the closed position or is in the closed position. Also, the parts of the cam mechanism have a large surface area of contact when the valve is in the open position, to minimize unit loading of the cam surfaces. The movable cam is movable axially relative to the actuator handle. The movable valve member is blocked from rotation relative to the valve body. The cam mechanism does not transmit spring force to the movable valve member when the valve member is in the closed position.

18 Claims, 7 Drawing Sheets

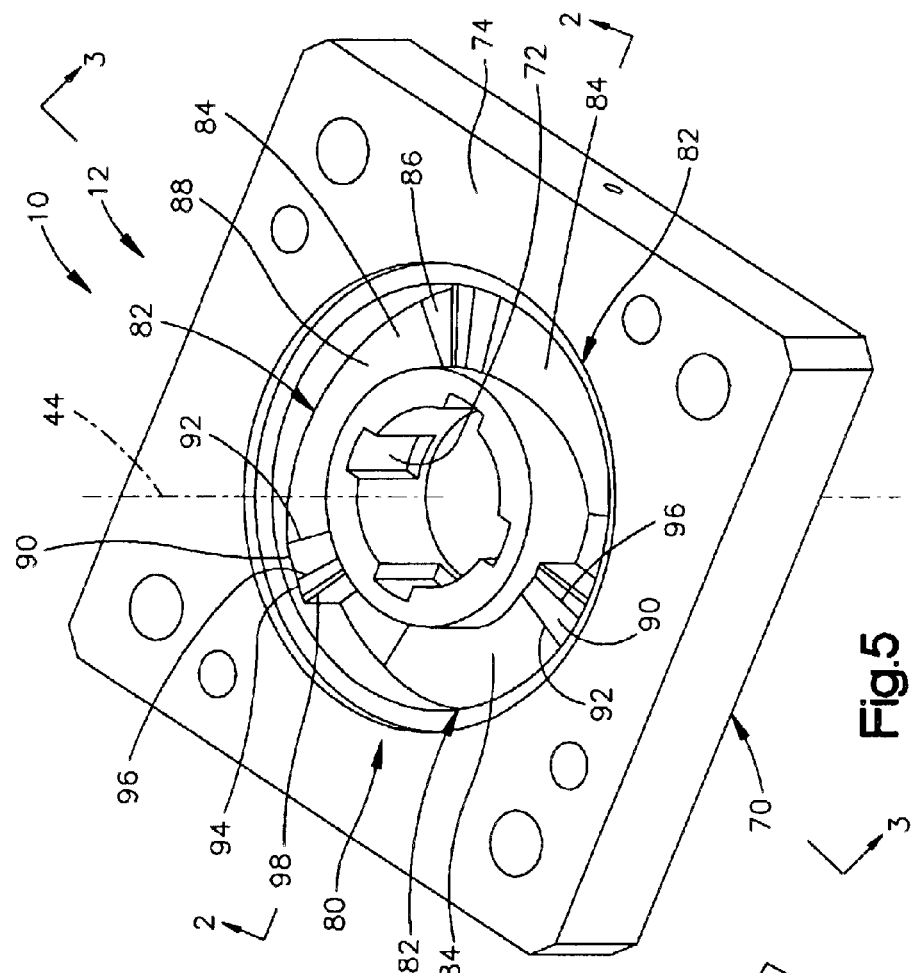
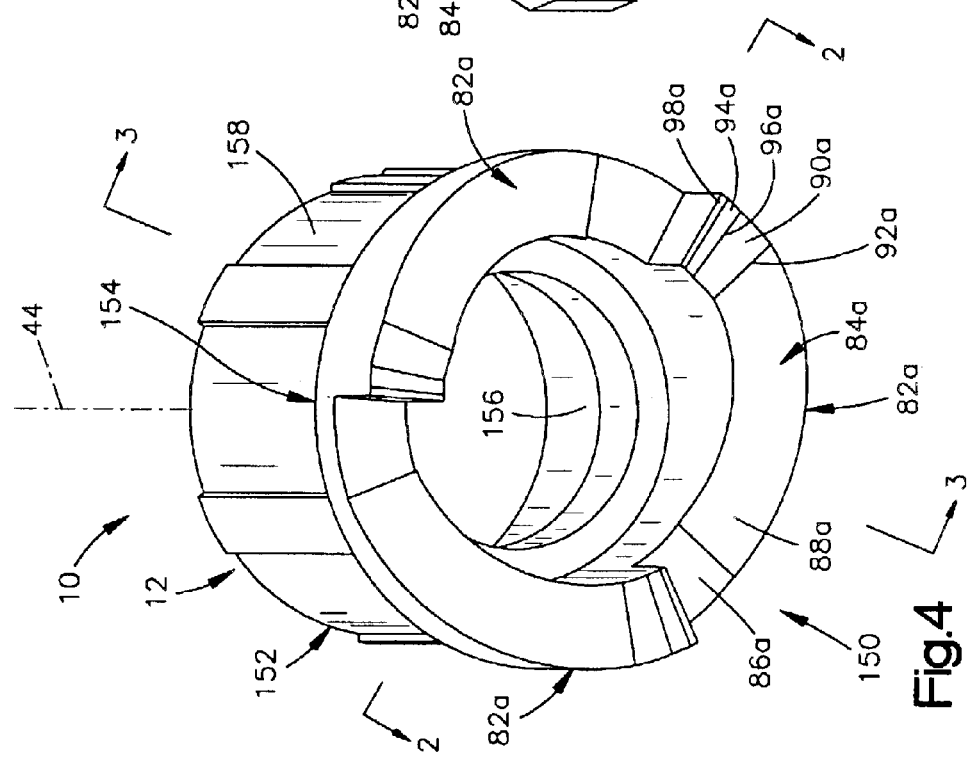

ROTARY VALVE ACTUATOR

This is an Application that claims the benefit of application Ser. No. 60/384,332, filed May 30, 2002.

BACKGROUND OF THE INVENTION

The present invention relates to a valve and an actuator for a valve. In particular, the present invention relates to a valve having an actuator responsive to rotational input for moving a first valve part axially between open and closed positions relative to a second valve part.

Many industrial valves have a valve member, such as a valve stem, that is movable relative to a valve seat between an open position spaced apart from the seat, enabling fluid flow through the valve, and a closed position in engagement with the valve seat. The movable valve member is often held in engagement with the valve seat by a spring. Over time, the valve member and/or the valve seat may wear, or under continued loading experience material creep, especially if made from plastic. If the valve member is not able to move farther toward the valve seat to compensate for such wear or creep, the valve may not close completely in some circumstances.

Some valves have a cam mechanism for opening and closing the valve. If the cam mechanism is interposed between the closing spring and the movable valve member, the cam mechanism may undesirably limit compensating movement of the valve member. In addition, the parts of the cam mechanism, themselves, if made from plastic, may be subject to material creep and/or deformation if subjected to the force of the closing spring for an extended period of time.

SUMMARY OF THE INVENTION

The present invention relates to a valve and a rotary actuator for a valve. The actuator includes a cam mechanism for transmitting opening force to a movable valve member to move the valve member off a valve seat, against the bias of a closing spring. The cam mechanism does not transmit closing spring force to the valve member when the valve member is being moved to the closed position or is in the closed position. Therefore, the spring can compensate for any material creep or deformation in the valve member or the valve seat.

In accordance with one feature of the invention, the cam mechanism includes two cams each having a full cam profile, rather than a cam and follower, to decrease unit loading on the cam surfaces. For example, there is a large surface area of contact when the valve is in the open position. In accordance with another feature of the invention, the movable cam is movable axially relative to the actuator handle.

In accordance with yet feature of the invention, the movable valve member is blocked from rotation relative to the valve body, to minimize wear of the valve seat and of the portion of the valve member that engages the valve seat. In accordance with still another feature of the invention, the cam mechanism does not transmit spring force to the movable valve member when the valve member is in the closed position.

BRIEF DESCRIPTION OF THE DRAWINGS

The foregoing and other features will become apparent to one skilled in the art upon consideration of the following description with reference to the accompanying drawings, in which:

FIG. 4 is a bottom perspective view of a movable cam that forms part of the valve of FIG. 1;

FIG. 5 is a top perspective view of a fixed cam that forms part of the valve of FIG. 1;

DETAILED DESCRIPTION OF THE INVENTION

Figure 1:
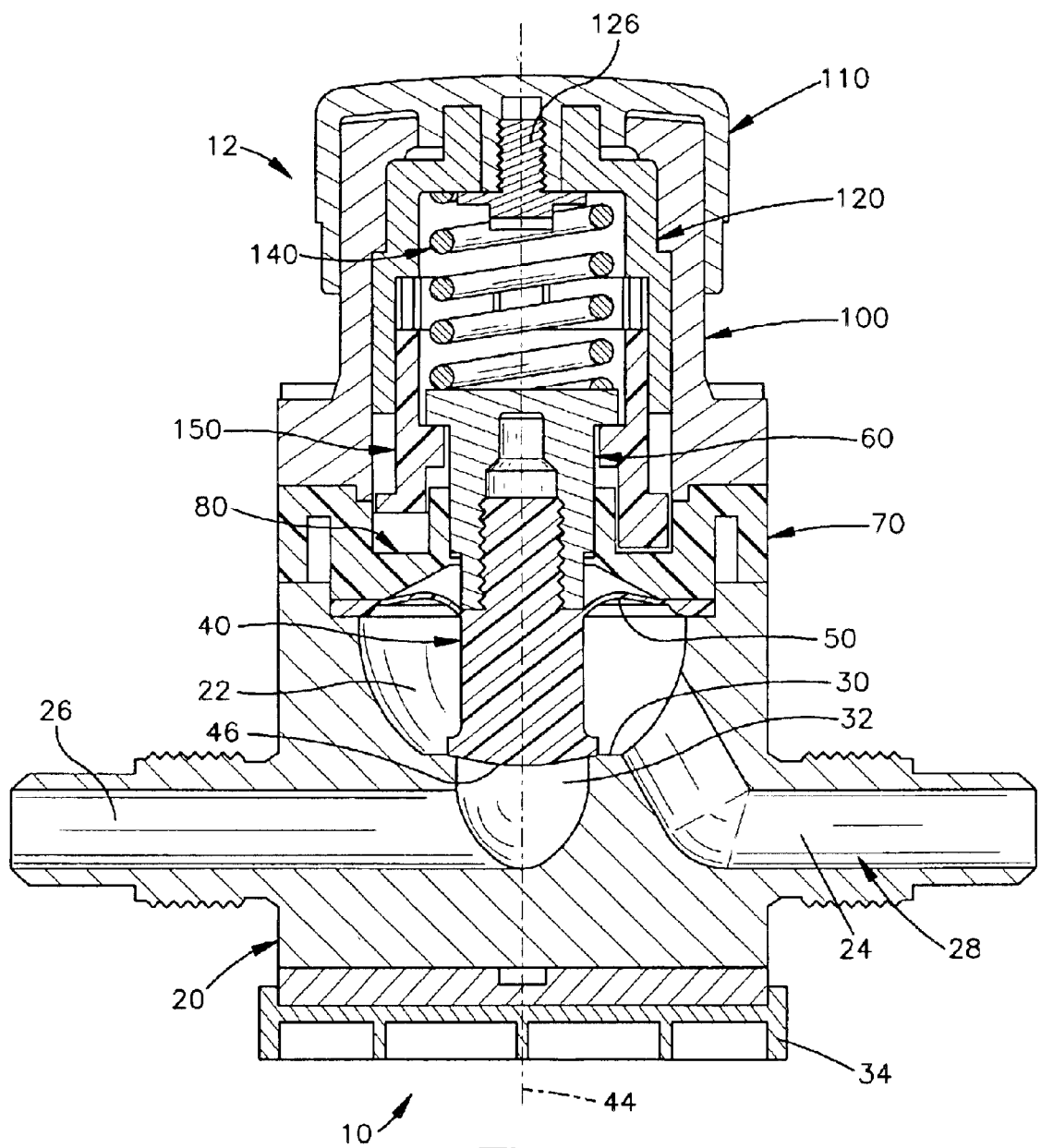
FIG. 1 is a longitudinal cross-sectional view of a radial diaphragm valve including a manual valve actuator in accordance with a one embodiment of the invention, with the valve shown in the closed position.

The present invention relates to a valve and an actuator for a valve. In particular, the present invention relates to a valve actuator responsive to rotational input for moving a first valve part axially between open and closed positions relative to a second valve part. The present invention is applicable to various valve actuator constructions. As representative of the present invention, FIG. 1 illustrates a valve 10 in accordance with one embodiment of the invention. The valve 10 is a radial diaphragm valve with a manually actuatable quarter turn valve actuator 12.

While the invention is illustrated with respect to a quarter turn valve actuator in a radial diaphragm valve, the invention may be used in other valve actuator designs and valves. The various aspects of the invention as set forth herein may be used individually or in various combinations with each other and with other valve and valve actuator designs, with the illustrated embodiment being intended to be exemplary in nature and not limiting as to use.

The valve 10 includes a valve body 20. The valve body 20 as illustrated is made from a single piece of molded plastic, but could be made in another manner and/or from a different material. (In the drawings, the valve body 20 is shown sectioned for metal, for clarity.) The valve body 20 defines a bowl-shaped valve cavity 22 in the valve body. The wider end of the valve cavity is uppermost as viewed in FIG. 1 (for convenience, this direction is referred to herein as "upward"; it should be understood that the valve 10 is usable in various orientations).

The valve body 20 includes a fluid inlet 26. The fluid inlet 26 is adapted to receive a fluid line for directing fluid to flow into the valve 10. The valve body 20 also includes a fluid outlet 24. The fluid outlet 24 is adapted to receive a fluid line for directing fluid to flow out of the valve 10. The fluid inlet 26, the fluid outlet 24, and the valve cavity 22 together form a fluid flow passage 28 in the valve 10.

The valve body 20 has a valve seat 30 that extends around and defines a variable orifice 32. The orifice 32 is located in the fluid flow passage 28. A valve mounting assembly shown schematically and partially at 34 is secured to the valve body 20 for mounting the valve 10.

The valve 10 includes a valve stem 40. The valve stem 40 has a main body portion 42 with a generally cylindrical configuration centered on a longitudinal central axis 44 of the valve 10. The main body portion 42 terminates in a tip 46. The main body portion 42 and the tip 46 of the valve stem 40 are disposed in the valve cavity 22 in the valve body 20. The valve stem 40 has an externally threaded extension 48 that extends axially from the main body portion 42.

Figure 2:
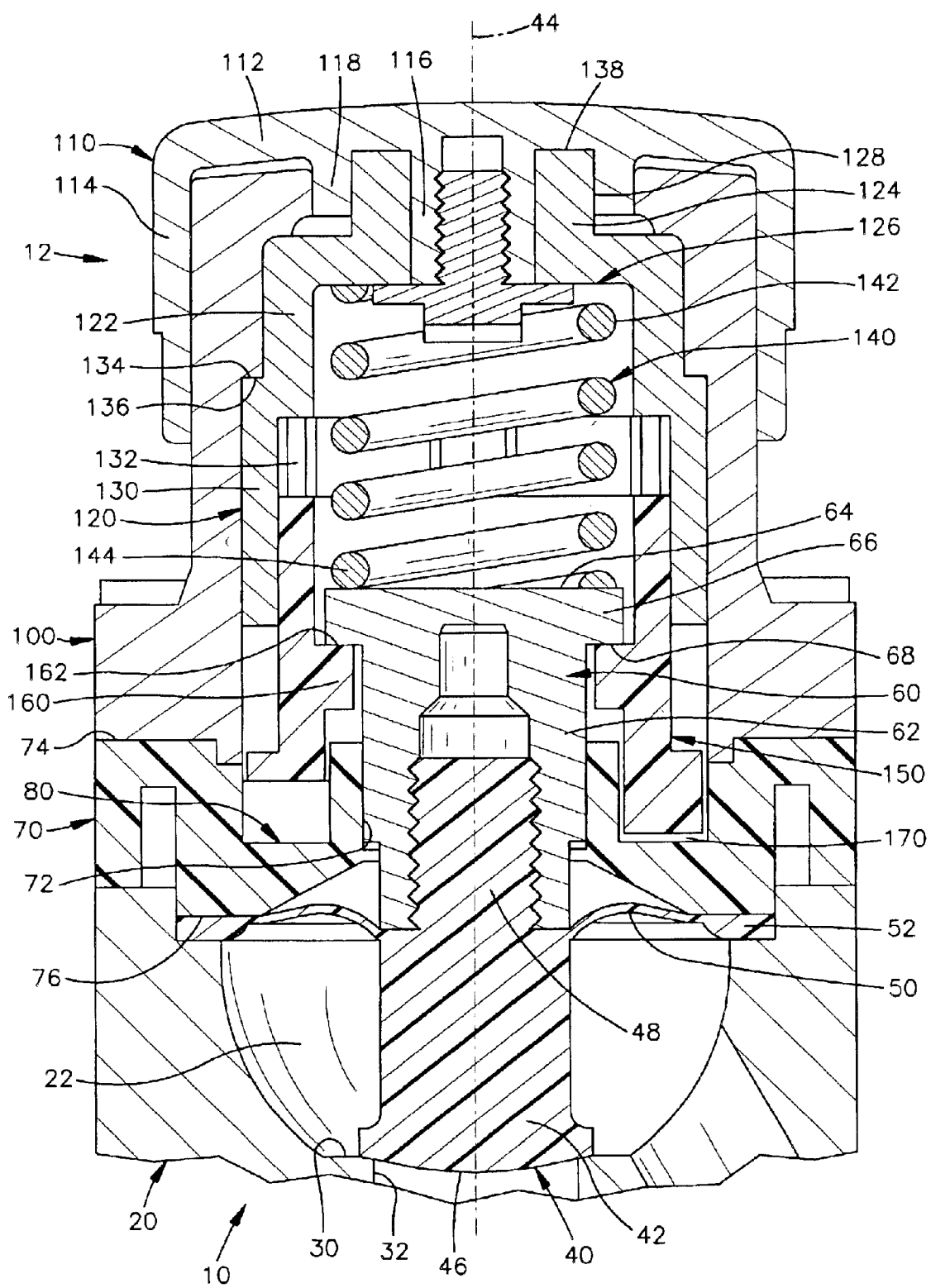
FIG. 2 is an enlarged view of a portion of FIG. 1.
Figure 3:
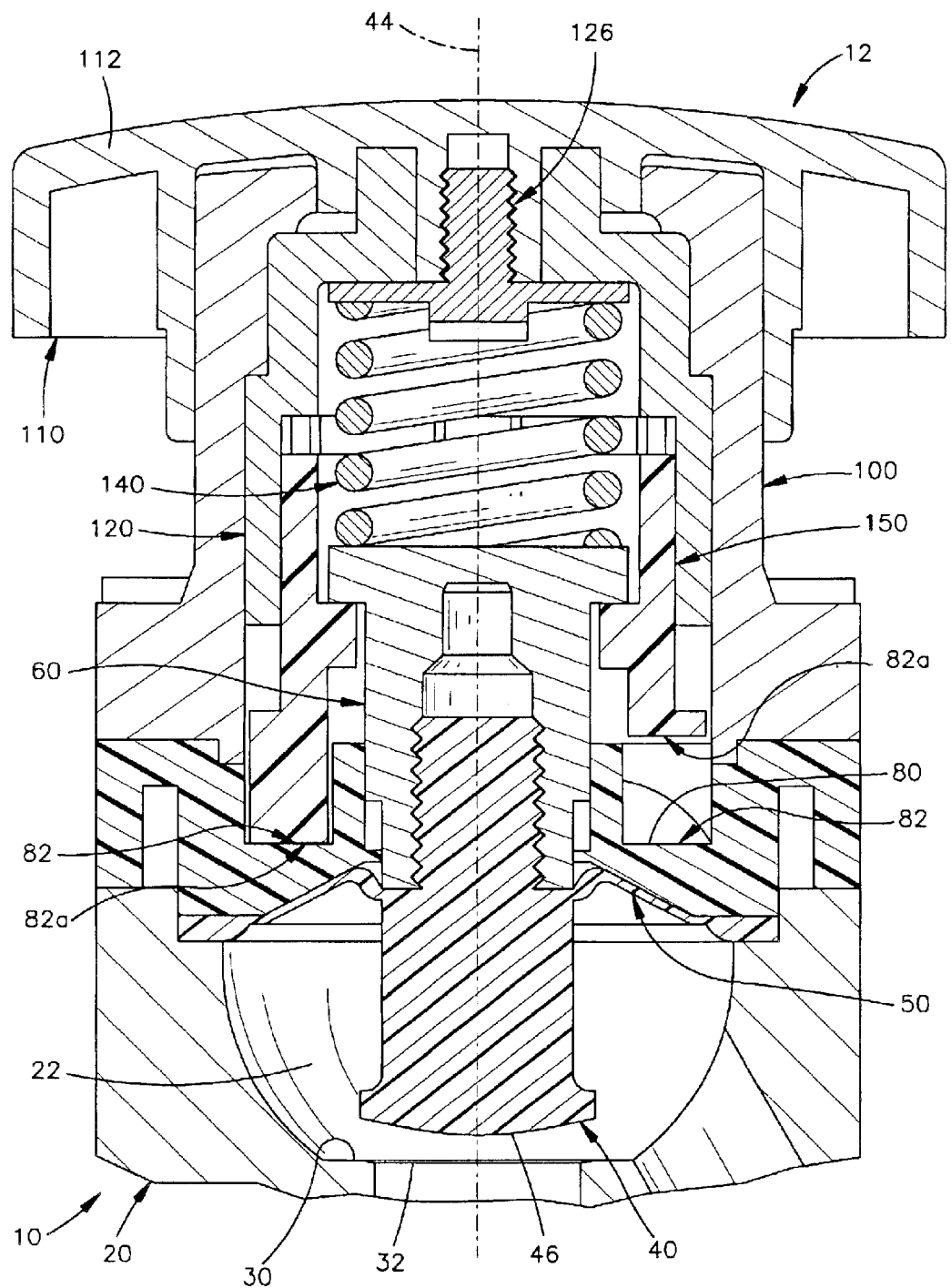
FIG. 3 is a view similar to FIG. 2 showing the valve in the open position.

The valve stem 40 is movable axially between a first position as shown in FIGS. 1 and 2 and a second position as shown in FIG. 3. When the valve stem 40 is in the first position, the tip 46 of the valve stem engages the valve seat 30 on the valve body 20. Fluid flow through the orifice 32, and thereby through the fluid flow passage 28, is blocked. The valve 10 is closed (in a closed condition). When the valve stem 40 is in the second position, the tip 46 of the valve stem is spaced apart axially from the valve seat 30 on the valve body 20. Fluid flow through the orifice 32, and thereby through the fluid flow passage 28, is enabled. The valve 10 is open (in an open condition).

The valve 10 also includes a diaphragm 50. In the illustrated embodiment, the diaphragm 50 is formed as one piece with the valve stem 40, preferably from polytetrafluoroethylene. The diaphragm 50 has a thin, flexible radial configuration with an outer edge portion 52. The diaphragm 50 closes the valve cavity 22 so that when the valve stem tip 46 is in engagement with the valve seat 30, the valve cavity is sealed.

The diaphragm 50 may be made in the manner noted in co-owned co-pending application Ser. No. 10/109,413, filed Mar. 28, 2002, titled Sanitary Diaphragm Valve, the entire disclosure of which is hereby incorporated by reference. Alternatively, the diaphragm 50 may be made in the manner noted U.S. Pat. No. 5,549,134, the entire disclosure of which is hereby incorporated by reference.

The valve actuator 12 includes an actuator stem 60. The actuator stem 60 is preferably made from plastic, but is shown sectioned for metal, for clarity. The actuator stem 60 has an externally splined main body portion 62 that is capped by a disk-shaped end portion 64. The end portion 64 of the actuator stem 60 has an annular shoulder 66 that projects radially outward from the main body portion 62. The shoulder 66 has an annular shoulder surface 68.

The actuator stem 60 is screwed on the valve stem 40. As a result, the valve stem 40 is fixed for axial movement with the actuator stem 60. When the actuator stem 60 and the valve stem 40 are thus secured together, the shoulder 66 on the actuator stem is presented axially toward the tip 46 of the valve stem and toward the valve cavity 22.

The valve actuator 12 includes a bonnet plate 70, which is preferably made from plastic. The bonnet plate 70 is fixed to the valve body 20 with a plurality of screws (not shown). The bonnet plate 70 has a splined inner surface 72, centered on the axis 44, that engages the external splines of the actuator stem 40. The inner surface 72 of the bonnet plate 70 supports the actuator stem 60 and thus the valve stem 40 for axial movement relative to the bonnet plate and the valve body 20. The splined connection between the bonnet plate 70 and the actuator stem 60 fixes the actuator stem and the valve stem 40 against rotation about the axis 44.

The bonnet plate 70 has an upper surface 74 that is presented away from the valve body 20. The bonnet plate 70 has an opposite lower surface 76 that is presented toward the valve cavity 22. The outer edge portion 52 of the diaphragm 50 is clamped between the bonnet plate 70 and the valve body 20.

A fixed cam 80 is formed on, and as part of, the bonnet plate 70, radially inward of the upper surface 74. The fixed cam 80 is part of the valve actuator 12. The fixed cam 80 has three identical cam sections 82 (FIG. 5), spaced apart equally in a circular array centered on the axis 44. Each one of the cam sections 82 has a circumferential extent of 120 degrees about the axis 44. A valve actuator in accordance with the present invention could include a fixed cam having more than three or fewer than three cam sections.

Each one of the three cam sections 82 of the fixed cam 80 has an outer cam surface 84 that includes several adjoining cam surface portions. A relatively short beginning flat portion, or first portion 86, of the cam surface 84 is disposed axially farthest from the upper surface 74 of the bonnet plate 70. The first cam surface portion 86 lies in a plane that extends perpendicular to the axis 44. Thus, the first cam surface portion 86 has the same axial position as it extends circumferentially around the axis 44 away from the adjacent cam section 82. In one design, this first cam surface portion 86 has a circumferential extent of about 23° about the axis 44.

A relatively long ramp portion, or second portion 88, of the cam surface 84 extends axially toward the upper surface 74 of the bonnet plate 70 as it extends circumferentially around the axis 44 away from the first portion 86. In the one design, this second cam surface portion 88 has a circumferential extent of about 80° about the axis 44.

A relatively short downward portion, or third portion 90, of the cam surface 84 extends axially away from the upper surface 74 of the bonnet plate 70 as it extends circumferentially around the axis 44 away from the ramp portion 88. In the one design, this third cam surface portion 90 has a circumferential extent of about 10° about the axis 44. The high point 92 between the second cam surface portion 88 and the third cam surface portion 90 forms a ridge of the cam section 82.

A relatively short upward portion, or fourth portion 94, of the cam surface 84 extends axially toward the upper surface 74 of the bonnet plate 70 as it extends circumferentially around the axis 44 away from the downward portion 90. In the one design, this fourth cam surface portion 94 has a circumferential extent of about 5°. The third cam surface portion 90 and the fourth cam surface section 94 together form a notch 96 in the cam section 82.

A very short ending flat portion, or fifth portion 98, of the cam surface 84 is disposed axially closest to the upper surface 74 of the bonnet plate 70. In the one design, this fifth cam surface portion 98 has a circumferential extent of only about 2°.

Figure 6:
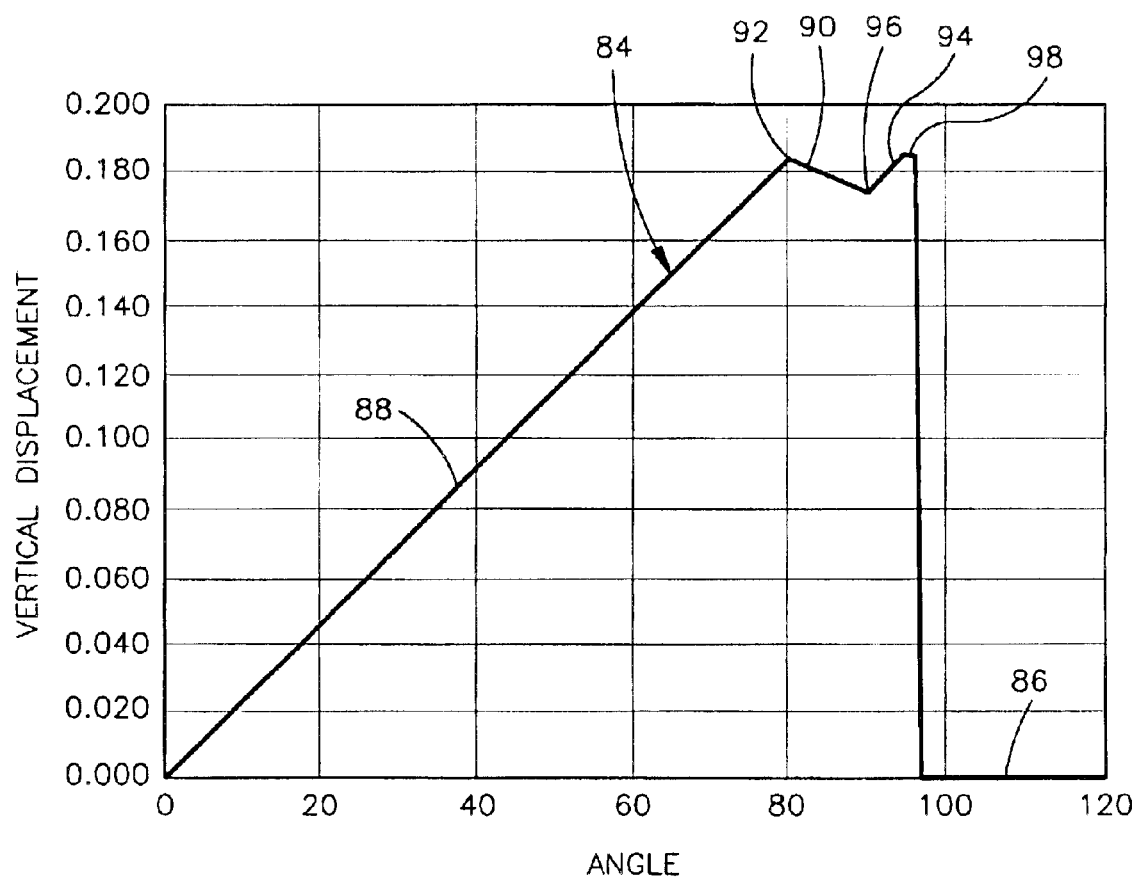
FIG. 6 is a graph illustrating displacement of the cams versus rotation angle.

FIG. 6 is a graph illustrating vertical displacement of the cam surface 84, as measured from the beginning flat cam surface portion 86 (shown for the adjacent cam surface 84), versus angle of movement around the cam 80 and the axis 44. The second or ramp section 88 of the cam surface 84 produces a constantly increasing vertical displacement. The third portion 90 of the cam surface 84 produces a short negative vertical displacement. The fourth portion 94 of the cam surface 84 produces a short positive vertical displacement. The fifth portion 98 of the cam surface 84 produces a short segment of almost no vertical displacement. The horizontal section 86 at the end of the graph represents the beginning flat portion, or first portion, of the adjoining cam surface 84.

It can thus be seen that the fixed cam 80 has a cam surface 84 with a cam profile that extends circumferentially for a significant distance on the fixed cam. The fixed cam 80 does not have a circumferentially short profile, like that of a cam follower, with the configuration of a bump or ridge.

The valve actuator 12 also includes an upper bonnet 100 (FIG. 2). The upper bonnet 100 is fixed to the bonnet plate 70 with a plurality of screws (not shown). The upper bonnet 100 has a generally cylindrical configuration centered on the axis 44.

The upper bonnet supports a force-receiving member, or handle, 110 for rotational movement relative to the upper bonnet 100 about the axis 44. The handle 110 is fixed in position axially on the upper bonnet 100. The handle 110 is thus fixed in position axially relative to the valve body 20. The handle 110 and the upper bonnet 100, which are made from plastic, are, for clarity, shown sectioned for metal in the drawings.

The force-receiving member, or handle, 110 is a device for receiving rotational force for the valve actuator 12. In the illustrated embodiment the force-receiving member, or handle, 110 is adapted for be manually engaged to receive force from an operator. Thus, the term "handle" is used herein to mean a device for receiving force to actuate the valve 10. The force-receiving member, or handle, 110 could be another type of device adapted to receive rotational force for the valve actuator 12.

The handle 110 in the illustrated embodiment has a cap-shaped configuration including a radially extending end wall 112 and an axially extending side wall 114. A mounting boss 116 and an inner rim 118 depend from the center of the end wall 112. The handle 110 includes portions (not shown) that are engageable with corresponding stop portions (not shown) on the upper bonnet 100, to restrict rotational movement of the handle, in a known manner, to about 90 degrees of rotation between the open and closed positions of the valve 10.

The valve actuator 12 further includes a drive sleeve 120. The drive sleeve 120 is preferably made from plastic, but is, for clarity, shown sectioned for metal. The drive sleeve 120 has a hollow configuration. A central portion 122 of the drive sleeve 120 engages the upper bonnet 100 and supports the drive sleeve for rotation relative to the upper bonnet.

An upper end portion 124 of the drive sleeve 120 is secured to the mounting boss 116 of the handle 110 by a screw 126. The upper end portion 124 is also externally splined and connected to the inner rim 118 of the handle 110 with a splined connection at 128. As a result, the handle 110 is fixed for rotation with the drive sleeve 120 relative to the upper bonnet 100, the bonnet plate 70, and the valve body 20, about the axis 44.

A lower side wall 130 of the drive sleeve 120 is internally splined at 132. A shoulder surface 134 on the drive sleeve 120 engages a shoulder surface 136 on the upper bonnet 100 to block axial movement of the drive sleeve 120 and the handle 110 in a direction away from the valve body 20, that is, upward as viewed in FIG. 1. An upper end surface 138 of the drive sleeve 120 is adjacent to the end wall 112 of the handle 110 to block axial movement of the drive sleeve and the handle in a direction toward the valve body 20, that is, downward as viewed in FIG. 1.

The valve actuator 12 includes a stem spring 140 that is received inside the drive sleeve 130. The stem spring 140 is a cylindrical compression spring. A first end portion 142 of the spring 140 abuts the screw 126. A second end portion 144 of the spring 140 abuts the end portion 64 of the actuator stem 60.

The spring 140 acts between the actuator stem 60 and the drive sleeve 120. The spring 140 biases the actuator stem 60 in a direction toward the valve seat 30, that is, downward as viewed in FIG. 1. The spring 140 thus biases the valve stem 40, which is fixed for movement with the actuator stem 60, into engagement with the valve seat 30, as shown in FIG. 1.

The valve actuator 12 includes a movable cam 150. The movable cam 150 is interposed between the drive sleeve 120 and the fixed cam 80. The movable cam 150 is operative as described below to transfer opening force from the drive sleeve 120 to the actuator stem. The movable cam 150 is rotatable about the axis 44 with the handle 110. The movable cam 150 is also movable axially (in a direction parallel to the axis 44) relative to the handle 110.

The movable cam 150 in the illustrated embodiment is a molded plastic piece having a cylindrical sleeve portion 152 (FIG. 4) and a generally annular body portion 154 at one end of the sleeve portion. The sleeve portion 152 of the movable cam 150 has a thin-walled tubular configuration with a cylindrical inner surface 156 and an axially splined outer surface 158. The splined outer surface 158 of the sleeve portion 152 of the movable cam 150 engages the splined inner surface 132 of the drive sleeve 120 to couple the movable cam for rotation with the drive sleeve. The splined connection allows relative axial movement between the movable cam 150 and the drive sleeve 120. Because the drive sleeve 120 is fixed to the handle 110, the splined connection thus allows relative axial movement between the movable cam 150 and the handle.

The movable cam 150 has an inner shoulder 160 (FIG. 2) with an annular, axially outward facing shoulder surface 162. The shoulder surface 162 is engageable with the shoulder surface 68 on the actuator stem 60, in a manner as described below to couple the actuator stem for upward movement with the movable cam.

The body portion 154 of the movable cam 150 has three identical cam sections 82a, spaced apart equally in a circular array centered on the axis 44. The cam sections 82a on the movable cam 150 are identical to the sections 82 on the fixed cam 80. Thus, the cam sections 82a of the movable cam, and their constituent parts, are given the same reference numerals as are used on the corresponding cam sections 82 on the fixed cam.

Each one of the cam sections 82a has a circumferential extent about the axis of 120 degrees. A valve actuator in accordance with the present invention could include a movable cam having more than three or fewer than three cam sections. Each one of the cam sections 82a has an outer cam surface 84a that includes several adjoining cam surface portions.

A relatively short beginning flat portion, or first portion 86a, of the cam surface 84a is disposed axially closest to the sleeve portion 152 of the movable cam 150. The first cam surface portion 86a lies in a plane that extends perpendicular to the axis 44. Thus, the first cam surface portion 86a has the same axial position as it extends circumferentially around the axis 44 away from the adjacent cam section 82a. In one design, this first cam surface portion 86a has a circumferential extent of about 23° about the axis 44.

A relatively long ramp portion, or second portion 88a, of the cam surface 84 extends axially away from the sleeve portion 152 of the movable cam 150 as it extends circumferentially around the axis 44 away from the first portion 86a. In one design, this second cam surface portion 88a has a circumferential extent of about 80° about the axis 44.

A relatively short downward portion, or third portion 90a, of the cam surface 84a extends axially toward the sleeve portion 152 of the movable cam 150 as it extends circumferentially around the axis 44 away from the ramp section 88a. In one design, this third cam surface portion 90a has a circumferential extent of about 10° about the axis 44. The high point 92a between the second cam surface portion 88a and the third cam surface portion 90a forms a ridge of the cam section.

A relatively short upward portion, or fourth portion 94a, of the cam surface 84a extends axially away from the sleeve portion 152 of the movable cam 150 as it extends circumferentially around the axis 44 away from the third portion 90a. In one design, this fourth cam surface portion 94a has a circumferential extent of about 5° about the axis 44. The third cam surface portion 90a and the fourth cam surface section 94a together form a notch 96a in the cam section 82a.

A very short ending flat portion, or fifth portion 98a, of the cam surface 94a is disposed axially farthest from the sleeve portion 152 of the movable cam 150. In one design, this fifth cam surface portion 98a has a circumferential extent of only about 2°.

Thus, the graph of FIG. 6, besides illustrating the cam profiled the cam surface 84 of the fixed cam 80, also illustrates the cam profile of the cam surface 84a of the movable cam 150. It can thus be seen that the movable cam 150 has a cam surface 84 with a cam profile that extends circumferentially for a substantial distance on the movable cam. The movable cam 150 is not merely a cam follower with a short circumferential extent, such as a bump or ridge.

FIGS. 1 and 2 illustrate the valve 10 in the closed position. When the valve 10 is in the closed position, the handle 110 of the valve actuator 12 is in a first position of rotation about the axis 44, relative to the valve body 20. The drive sleeve 120, which is fixed for rotation with the handle 110, is also in a first position of rotation about the axis 44, relative to the valve body 20.

The stem spring 140 is relatively extended. The stem spring 140 acts between the drive sleeve 120 and the actuator stem 60 to bias the valve stem 40 axially in a direction toward the valve seat 30, or downward as viewed in FIG. 1. The tip 46 of the valve stem 40 is in engagement with the valve seat 30 on the valve body 20. This engagement closes the orifice 32. Fluid flow from the fluid inlet 26 to the fluid outlet 28, through the fluid flow passage 28 including the valve cavity 22, is blocked.

When the valve 10 is in the closed position, the movable cam 150, which is splined for rotation with the handle 110, is in its own first position of rotation about the axis 44, relative to the valve body 20 and relative to the fixed cam 80 on the bonnet plate 70.

When the movable cam 150 is in the first position of rotation, the movable cam is in an axial position relatively close to the valve body 20. This position is illustrated graphically in FIG. 8. The three ramp surface portions 88a (FIG. 8) on the three cam sections 82a of the movable cam 150 overlie the three ramp surface portions 88 on the three cam sections 82 of the fixed cam 80. The ridges 92a on the cam sections 82a of the movable cam 150 are disposed adjacent to the beginning flats 86 on the cam sections 82 of the fixed cam 80, as described below in more detail. Similarly, the ridges 92 on the cam sections 82 of the fixed cam 80 are disposed adjacent to the beginning flats 86a on the cam sections 82a of the movable cam 150. There is, however, no spring force passing through the cams 80 and 150; they simply lie adjacent to each other, as described below in detail.

To move the valve from the closed condition to the open condition (FIG. 3), the handle 110 is manually rotated about the axis 44 in an opening direction. As the handle 110 is rotated, the drive sleeve 120, which is splined to the handle, rotates with the handle about the axis 44. As the drive sleeve 120 rotates, the movable cam 150, which is splined to the drive sleeve, rotates with the drive sleeve about the axis 44.

Rotation of the movable cam 150 about the axis 44 causes the cam sections 82a on the movable cam to rotate relative to the fixed cam 80. As the movable cam 150 rotates, it engages and begins to slide along the fixed cam 80. The movable cam 150 simultaneously both rotates and is driven away from (moves axially away from) the valve body 20. Specifically, the ramp surfaces 88a on the movable cam sections 82a slide along the ramp surfaces 88 on the fixed cam sections 82. The ridges 92a on the cam sections 82a of the movable cam 150 move toward the notches 96 in the cam sections 82 of the fixed cam 80.

As the movable cam 150 thus moves axially away from the valve body 20 while rotating, the shoulder surface 162 (FIG. 2) on the movable cam engages the shoulder surface 68 on the actuator stem 60. The shoulder 160 on the movable cam 150 transmits the axial and rotational force of the movable cam to the actuator stem 60. The actuator stem 60 is thereby caused to move axially away from the valve body 20, that is, upwardly as viewed in FIG. 1.

The axial movement of the actuator stem 60 pulls the valve stem 40, which is fixed for movement with the actuator stem, axially away from the valve seat 30. The tip 46 of the valve stem 40 moves out of engagement with the valve seat 30, opening the orifice 32 and establishing fluid communication between the fluid inlet 26 and the fluid outlet 24 through the fluid flow passage 28.

Because the actuator stem 60 is splined to the bonnet plate 70, the actuator stem does not rotate, nor does the valve stem 40. Thus, there is no relative rotation between the valve stem tip 46 and the valve seat 30 during movement of the valve 10 out of the closed position as described. This lack of relative rotation helps to minimize wear of the valve stem tip 46 and of the valve seat 30.

The axial movement of the actuator stem 60 also compresses the stem spring 140 against the screw 126 and the drive sleeve 120. Because the spring 140 is being compressed, the rotation of the handle 110 in the opening direction is resisted by the force of the spring. The overall movement of the valve 10 from the closed position to the open position is thus resisted by the force of the spring 140.

Figure 7:
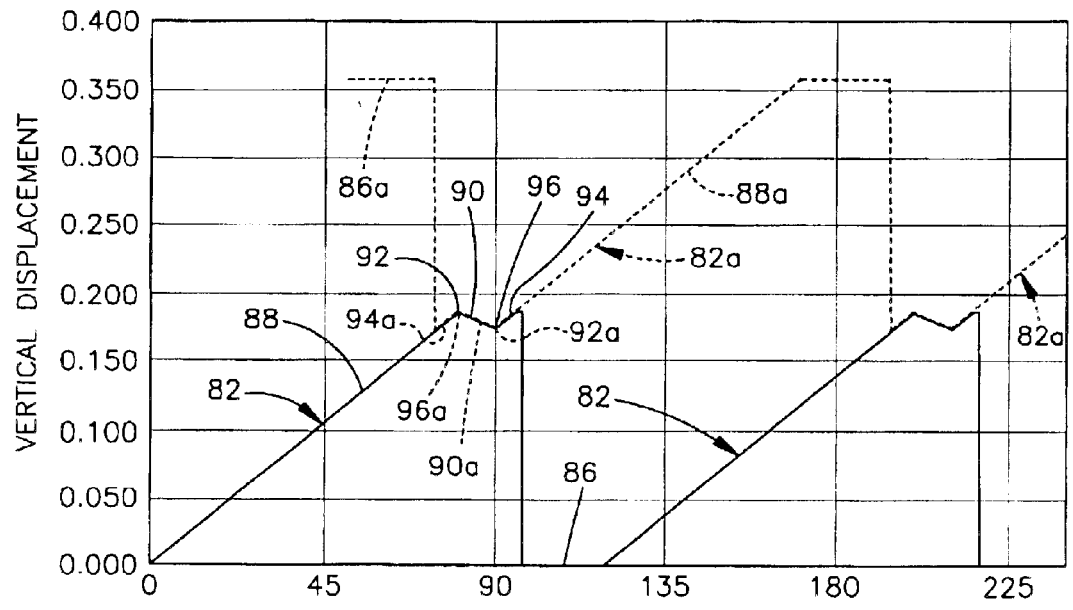
FIG. 7 is a graph illustrating the relative positions of the fixed cam and the movable cam when the valve is in the open position.

When the rotation of the handle 110 in the opening direction reaches an amount in the range of about 75 degrees to 85 degrees from the closed position, and preferably about 80 degrees, the ridges 92a on the cam sections 82a of the movable cam 150 rise up over the ridges 92 on the cam sections 82 of the fixed cam 80 and then drop into the notches 96 on the cam sections of the fixed cams, as shown in FIG. 7. Likewise, the ridges 92 on the cam sections 92 of the fixed cam 80 rise up over the ridges 92a on the cam sections 82a of the movable cam 150 and then drop into the notches 96a on the movable cam 150. A tangible and audible snap, or click, is produced as this movement occurs, to indicate to the operator that the valve 10 is in the open condition.

This engagement of the ridges 92 and 92a on the cam sections 82 and 82a, in the notches 96a and 96, acts as a detent. There is no further rotational movement of the movable cam 150, the drive sleeve 120, and the handle 110. The parts of the valve 10 are maintained in the open position against the force of the spring 140.

When the valve 10 is thus in the open position, the tip 46 of the valve stem 40 is farthest away from the valve seat 30, and the area for fluid flow through the orifice 32 is at its greatest. The valve 10 is maintained (locked) in the open condition by the engagement of the cam sections 82a of the movable cam 150 with the cam sections 82 of the fixed cam 80.

To move the valve 10 from the open condition to the closed condition, the handle 110 is manually rotated about the axis 44 in an opposite, closing, direction. As the handle 110 is rotated, the drive sleeve 120, which is splined to the handle, rotates with the handle. As the drive sleeve 120 rotates, the movable cam 150, which is splined to the drive sleeve, rotates with the drive sleeve about the axis 44.

Rotation of the movable cam 150 about the axis 44 causes the cam sections 82a on the movable cam to move relative to (slide along) the cam sections 82 on the fixed cam 80. The ridges 92a on the cam sections 82a of the movable cam 150 move circumferentially out of the notches 96 on the fixed cam sections 82, move over the ridges 92 on the fixed cam sections, and move onto the ramp surfaces 88 of the fixed cam sections.

The ramp surfaces 88a on the movable cam sections 82a follow, moving into engagement with the ramp surfaces 88 on the fixed cam sections 82. As this relative movement of the fixed cam 80 and the movable cam 150 occurs, the cams shift position sufficiently that the movable cam is able to begin moving axially toward its first position, that is, to begin moving in a direction away from the handle 110 and toward the valve body 20.

At the same time, the force of the spring 140 biases the actuator stem 60, the valve stem 40, and the movable cam 150 in the direction away from the handle 110 and toward the valve body 20. As the movable cam 150 rotates, this spring force simultaneously moves the movable cam axially, in the direction toward the valve body 20. The actuator stem 60 and the valve stem 40 move axially only, and do not rotate, because of the splined connection between the actuator stem and the bonnet plate 70.

The spring force from the stem spring 140 is transmitted directly through the actuator stem 60 to the valve stem 40; the spring force does not flow to the valve stem through the movable cam 150. The movable cam 150 does not drive the valve stem 40 to a closed position. In comparison, the movable cam 150 does drive the valve stem 40 from the closed position to the open position; the opening force applied to the handle 110 flows through the movable cam 150 during that operation.

The valve 10 moves automatically from the open position to the closed position once the actuator 12 moves off the "open" detent". Then, when the parts have rotated for about 75 to 80 degrees from the open position, the tip 46 of the valve stem 40 engages and seats on the valve seat 30. This engagement blocks further movement of the valve stem 40 and the actuator stem 60 in the closing direction. The valve stem tip 46 engages the valve seat 30 with only axial movement, and not rotational movement, because the valve stem 40 does not rotate.

When the valve 10 thus assumes the closed position, the spring 140 is not fully relaxed and therefore maintains its biasing force that keeps the valve tightly closed. Thus, it is the force of the spring 140, rather than the manual force applied to the handle 110, that actually seats the valve stem 40 on the valve seat 30. This provides a less abrupt closing of the valve 10, reducing hydraulic shock and hydraulic transients for a liquid fluid system in which the valve is located. In addition, the operator does not need to torque the handle 110 to a fully closed position to make sure that the valve 10 is closed; the valve closes automatically by the spring force.

When the valve 10 is in the closed condition, the movable cam 150 is not at the end of its range of travel toward the fixed cam 80. The ramp surfaces 88a on the cam sections 82a of the movable cam 150 are still in engagement with the ramp surfaces 88 on the cam sections 82 of the fixed cam 80. The movable cam 150 can freely rotate in the closing direction relative to the fixed cam 80. If it does so rotate, it moves axially away from the actuator stem 60, so that a gap 170 (FIG. 2) is present between the actuator stem and the movable cam 150 when the valve 10 is closed. Even if the movable cam 150 does not so rotate, there is still no spring force transmitted through the movable cam 150 to the valve member 40.

As a result, the movable cam 150 is not clamped between the fixed cam 80 and the actuator stem 60 (and the valve stem 40), but rather is "floating" between the fixed cam and the actuator stem. Thus, even though the actuator stem 60 is being urged in the closing direction by the spring 140, the shoulder 66 of the actuator stem is not urging the movable cam 150 into engagement with the fixed cam 80. The movable cam 150 is not interposed in a force-transmitting relationship between the spring 140 and the valve member 40.

Because the valve seat 30 and the valve stem 40 are made from plastic, they are subject to material creep or other deformation over time. The presence of the gap 170 between the actuator stem 60 and the movable cam 150 assures that the spring 140 applies a closing force to hold the stem tip 46 against the valve seat 30, compensating for any such material creep. If the valve tip 46 or the valve seat 30 wears, or if there is material creep, the spring 140 can still move the valve stem 40 farther down in the closing direction to compensate for that wear, because the cams 80 and 150 are not blocking that movement.

FIG. 7 illustrates graphically the relative positions of the fixed cam 150 and the movable cam 80 when the valve 10 is in the open position. The cam profile of the fixed cam 80 is represented by the solid line. The cam profile of the movable cam 150 is represented by the dashed line.

When the valve 10 is in the open position, the third surface portion 90a of the movable cam 150 abuttingly engages the third surface portion 90 of the fixed cam 80. The fourth surface portion 94a of the movable cam 150 abuttingly engages a small section of the second (ramp) surface portion 88 of the fixed cam 80. A small section of the second (ramp) surface portion 88a of the movable cam 150 abuttingly engages the fourth surface portion 94 of the fixed cam 80.

The ridge 92a on the movable cam 150 section is disposed in the notch 96 in the fixed cam section 80. The ridge 92 on the fixed cam 80 is disposed in the notch 96a in the movable cam 150. There is about 22° of overlap of the two cam sections 82 and 82a when the valve 10 is in the open position.

Figure 8:
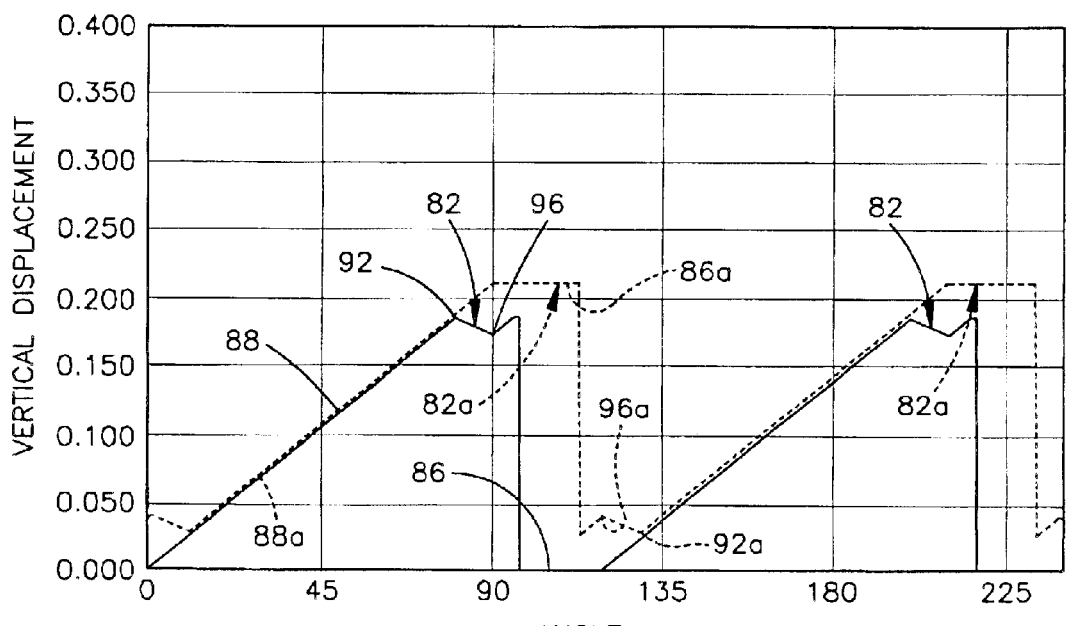
FIG. 8 is a graph illustrating the relative positions of the fixed cam and the movable cam when the valve is in the closed position.

FIG. 8 illustrates graphically the relative positions of the fixed cam 80 and the movable cam 150 when the valve 10 is in the closed position. The cam profile of the fixed cam 80 is represented by the solid line. The cam profile of the movable cam 150 is represented by the dashed line.

When the valve 10 is in the closed position, the second (ramp) surface portion 88a of the movable cam 150 overlies the second (ramp) surface portion 88 of the fixed cam 80. As discussed above, the two cams 80 and 150, if they do engage when in the closed position, are not subjected to the spring force of the spring 140. Rather, the movable cam 150 is free floating and simply rests of its own weight on the fixed cam 80. There is about 68° of overlap of the two cam sections 82 and 82a. No other portions of the two cam section 82 and 82a overlap.

Figure 9:
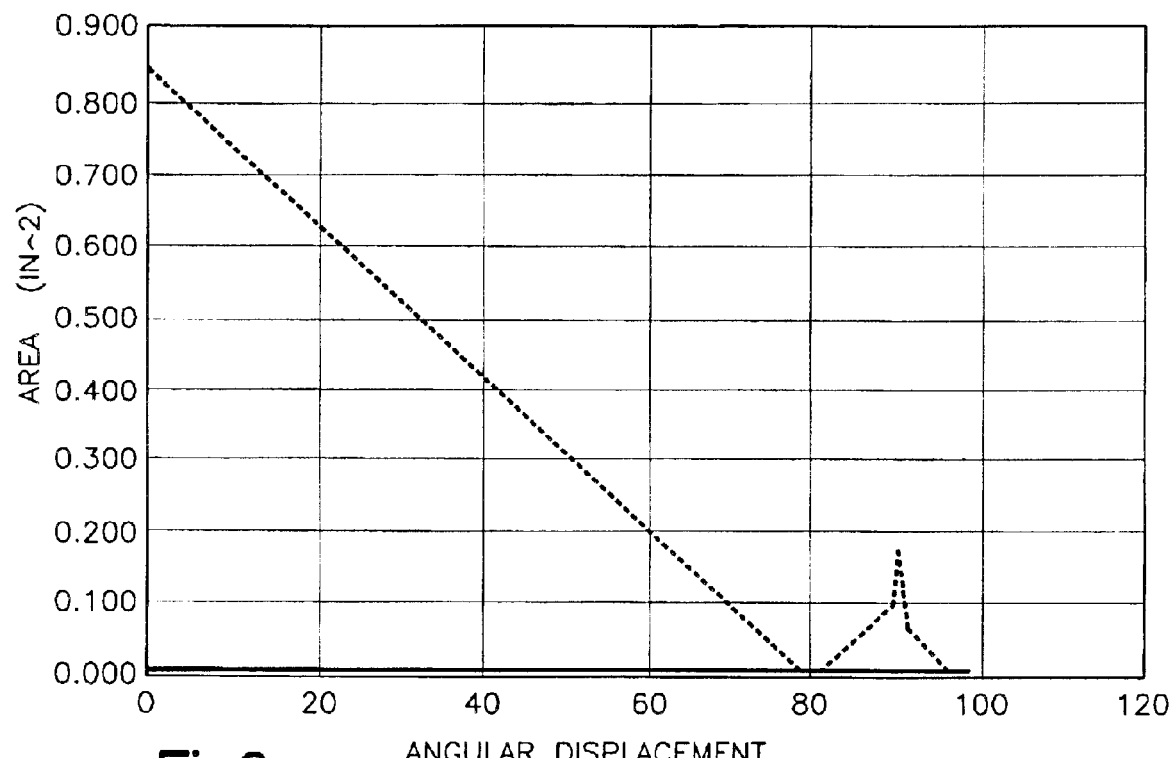
FIG. 9 is a graph illustrating the relationship between angular displacement and contact area between the fixed cam and the movable cam.

FIG. 9 is a graph illustrating the relationship between angular displacement and contact area between the fixed cam 80 and the movable cam 150. In FIG. 9, the surface area of contact of the valve actuator 12 is shown as the dashed line. For comparison, the contact area of a cam and cam follower valve actuator design is shown as a solid line, where the cam follower is simply a bump or ridge with a short effective circumferential length, for example, less than ten degrees.

In FIG. 9, the origin represents "zero" angular displacement, that is, the closed position of the valve 10. At that location, the surface area of contact (assuming the cams engage) is at its highest. In one valve 10 constructed in accordance with the invention, the surface area of contact between the two cams 80 and 150, at the closed position, is about 0.85 square inches. In the closed position, the cams are not under spring force, of course, even if the cams are in contact with each other.

As the valve 10 moves from the closed position toward the open position, the relative positions of the fixed cam 80 and the movable cam 150 change in a manner such that the surface area of contact between them decreases. The surface area of contact reaches a minimum at about 80 degrees of angular displacement. At this position the ridge 92a on the movable cam section 82a is located on the ridge 92 on the fixed cam section 82.

As the valve 10 continues to move toward the open position, the surface area of contact increases again and peaks at about 90 degrees of rotation. This peak occurs when the valve 10 is in the open position as shown in FIGS. 3 and 7. In the one valve 10 constructed in accordance with the invention that is described above, the surface area of contact at the open position is just under about 0.2 square inches. This area is about 19% of the surface area of contact when the valve 10 is in the closed position.

Figure 10:
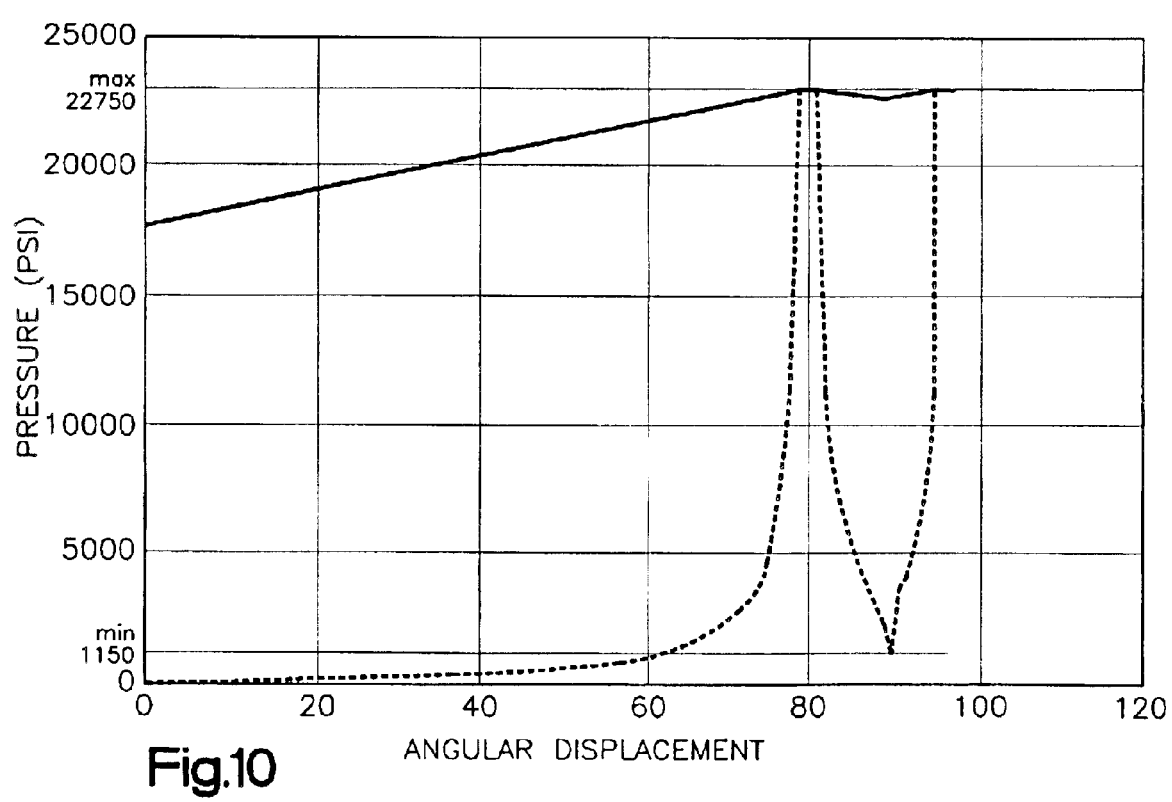
FIG. 10 is a graph illustrating the relationship between angular displacement and surface pressure in the contact area between the fixed cam and the movable cam.

FIG. 10 is a graph illustrating the relationship between angular displacement and surface pressure in the contact area between the fixed cam 80 and the movable cam 150. The surface pressure in the valve actuator 12 is shown as a dashed line. For comparison, the surface pressure of a cam and cam follower valve actuator design is shown as a solid line.

In FIG. 10, the origin represents "zero" angular displacement, that is, the closed position of the valve 10. At that location, the surface pressure between the cams 80 and 150 is lowest. Specifically, because the force of the stem spring 140 is not exerted on the cams 80 and 150, the surface pressure when the valve is closed is zero. The cams 80 and 150 are not in force-transmitting engagement with the stem spring 140.

As the valve 10 begins to move from the closed position to the open position, the force of the spring 140 comes into play and the two cams 80 and 150 engage each other. The relative positions of the fixed cam 80 and the movable cam 150 change in a manner such that the surface pressure in the area of contact increases.

The surface pressure increases gradually until about 75 degrees of angular displacement, then increases rapidly to a peak at about 80 degrees of angular displacement. At this position the ridge 92a on the movable cam section 82a is located on the ridge 92 on the fixed cam 82 section. In the one valve 10 constructed in accordance with the invention that is described above, the surface pressure in the area of contact at this peak is about 22,750 psi.

As the valve 10 continues to move toward the open position, the surface pressure in the area of contact between the cams 80 and 150 decreases rapidly until it reaches a low point at about 90 degrees of rotation. This low point occurs when the valve 10 is in the open position in which the ridges 92 on the fixed cam 80 drop into the notches 96a in the movable cam 150, and the ridges 92a on the movable cam drop into the notches 96 in the fixed cam. In the one valve 10 constructed in accordance with the invention that is described above, the surface pressure in the area of contact between the cams 80 and 150, at the open position, is about 1150 psi. This pressure is about 5% of the peak surface pressure (just before the cams 80 and 150 drop into "open detent" position). The pressure drops to a level experienced previously at between about 60 degrees and 70 degrees of displacement.

The valve 10 can be either open, closed, or moving between the open and closed positions most of the time. The time of movement between the open and closed conditions is brief and transitory. Therefore, most of the time the valve 10 is either in the closed position or in the open position. The plastic materials of which the valve actuator 12 is made are inevitably subject to creep under sustained compression loading, which loading occurs when the valve 10 is open. With the present valve actuator 12, the unit loading on the cams 80 and 150 is very low when the valve 10 is in the open position, as shown and described above, because of the large surface area of contact in the open position. In addition, the unit loading on the cams 80 and 150 is effectively zero when the valve 10 is in the closed condition, because no spring force is being transmitted. Because of this low unit loading, there is minimal creep or other deformation of the materials of the valve actuator 12, including the valve stem, the valve seat, and the cams themselves, compared to a valve actuator that might use only one cam surface and an associated bump/ridge as a cam follower.

From the above description of the invention, those skilled in the art will perceive improvements, changes, and modifications in the invention. Such improvements, changes, and modifications within the skill of the art are intended to be included within the scope of the appended claims.

Having described the invention, we claim:

1. A valve actuator for a rotary valve that has a valve seat and a movable valve member movable relative to the valve seat between an open position enabling fluid flow through the valve and a closed position blocking fluid flow through the valve, said valve actuator comprising:

a spring biasing the movable valve member toward the closed position;

a handle for receiving actuating force, said handle being supported for rotation relative to the valve seat in an opening direction and in a closing direction about an axis;

a first cam fixed in position relative to the valve seat; and an axially movable second cam engageable with said first cam and rotatable in response to rotation of said handle in the opening direction to effect movement of the movable valve member from the closed position toward the open position against the bias of said spring in response to the application of actuating force to said handle;

said second cam being movable axially relative to said handle;

each one of said first and second cams having a cam surface defining a circumferentially extending cam profile.

2. A valve actuator as set forth in claim 1 wherein each one of said cam surfaces and cam profiles of said first and second cams extends circumferentially for at least about 20 degrees.

3. A valve actuator as set forth in claim 1 wherein each one of said cam surfaces and cam profiles of said first and second cams extends circumferentially for an amount in the range of from about 90 degrees to about 120 degrees.

4. A valve actuator as set forth in claim 1 wherein said cam surfaces of said first and second cams are in engagement with each other for at least about 20 degrees when in the open position.

5. A valve actuator as set forth in claim 1 wherein said handle is fixed against axial movement relative to the valve seat.

6. A valve actuator as set forth in claim 6 including at least one splined connection transmitting rotary force between said handle and said second cam, said splined connection enabling axial movement of said second cam relative to said handle.

7. A valve actuator as set forth in claim 1 for a rotary valve wherein the movable valve member is blocked from rotation relative to the valve seat.

8. A valve actuator as set forth in claim 1 wherein said spring acts on the movable valve member to move the movable valve member from the open position toward the closed position without transmission of spring force to the movable valve member through said second cam.

9. A valve actuator for a rotary valve that has a valve seat and a movable valve member movable relative to the valve seat between an open position enabling fluid flow through the valve and a closed position blocking fluid flow through the valve, the movable valve member being fixed against rotation relative to the valve seat, said valve actuator comprising:

a spring biasing the movable valve member toward the closed position;

a handle for receiving actuating force, said handle being supported for rotation relative to the valve seat in an opening direction and in a closing direction about an axis;

a first cam fixed in position relative to the valve seat, said fixed cam being formed as part of a plate member fixed to the valve seat, and including a splined connection between the movable valve member and said plate member, said splined a connection enabling axial movement of the movable valve member relative to said plate member, said splined connection blocking rotation of the movable valve member relative to said plate member; and an axially movable second cam engageable with said first cam and rotatable in response to rotation of said handle in the opening direction to effect movement of the movable valve member from the closed position toward the open position against the bias of said spring in response to the application of actuating force to said handle;

said second cam being movable axially relative to said handle.

10. A valve actuator for a rotary valve that has a valve seat and a movable valve member movable relative to the valve seat between an open position enabling fluid flow through the valve and a closed position blocking fluid flow through the valve, said valve actuator comprising:

a spring biasing the movable valve member toward the closed position;

a handle for receiving actuating force, said handle being supported for rotation relative to the valve seat in an opening direction end in a closing direction about an axis;

a first cam fixed in position relative to the valve seat; and an axially movable second cam engageable with said first cam and rotatable in response to rotation of said handle in the opening direction to effect movement of the movable valve member from the closed position toward the open position against the bias of said spring in response to the application of actuating force to said handle;

each one of said first and second cams having a cam surface defining a circumferentially extending cam profile;

said spring acting on the movable valve member to move the movable valve member from the open position toward the closed position without transmission of spring force to the movable valve member through said second cam.

11. A valve actuator as set forth in claim 10 wherein said second cam is free floating relative to said first cam when the movable valve member is in the closed position.

12. A valve actuator as set forth in claim 10 wherein said second cam has a shoulder for transmitting axial force to the movable valve member to move the movable valve member from the closed position toward the open position in response to rotation of said second cam relative to said first cam in an opening direction, said second cam being axially movable relative to said first cam upon seating of the movable valve member on the valve seat.

13. A valve actuator as set forth in claim 10 for a rotary valve wherein the movable valve member is blocked from rotation relative to the valve seat.

14. A valve actuator as set forth in claim 10 wherein said second cam is movable axially relative to said handle.

15. A valve actuator for a rotary valve that has a valve seat and a movable valve member movable relative to the valve seat between an open position enabling fluid flow through the valve and a closed position blocking fluid flow through the valve, the movable valve member being fixed against rotation relative to the valve seat, said valve actuator comprising:

a spring biasing the movable valve member toward the closed position;

a handle for receiving actuating force, said handle being supported for rotation relative to the valve seat in an opening direction and in a closing direction about an axis;

a first cam fixed in position relative to the valve seat; and an axially movable second cam engageable with said first cam and rotatable in response to rotation of said handle in the opening direction to effect movement of the movable valve member from the closed position toward the open position against the bias of said spring in response to the application of actuating force to said handle;

each one of said first and second cams having a cam surface defining a circumferentially extending cam profile.

16. A valve actuator as set forth in claim 15 wherein said second cam is movable axially relative to said handle.

17. A valve actuator as set forth in claim 15 wherein said spring acts on the movable valve member to move the movable valve member from the open position toward the closed position without transmission of spring force to the movable valve member through said second cam.

18. A valve actuator for a rotary valve that has a valve seat and a movable valve member movable relative to the valve seat an open position enabling fluid flow through the valve and a closed position blocking fluid flow through the valve, said valve actuator comprising:

a spring biasing the movable valve member toward the closed position;

a handle for receiving actuating force, said handle being supported for rotation relative to the valve seat in an opening direction and in a closing direction about an axis;

a first cam fixed in position relative to the valve seat; and an axially movable second cam engageable with said cam and rotatable in response to rotation of said handle in the opening direction to effect movement of the movable valve member from the closed position toward the open position against the bias of said spring in response to the application of actuating force to said handle;

said spring exerting a force that when transmitted between said first and second cams produces a surface pressure between said first and second cams that varies in amount depending on the relative rotational position of said first and second cams;

the surface pressure between said first and second cams arising from the spring force when the valve member is in the closed position being zero;

each one of said first and second cams having a cam surface defining a circumferentially extending cam profile.

* * * * *

UNITED STATES PATENT AND TRADEMARK OFFICE
CERTIFICATE OF CORRECTION

PATENT NO. : 6,860,469 B2
DATED : March 1, 2005
INVENTOR(S) : David C. Kerg et al.

It is certified that error appears in the above-identified patent and that said Letters Patent is hereby corrected as shown below:

Column 13,
Line 5, delete the word "a".

Column 14,
Line 8, delete "end" and insert -- and --.

Column 15,
Line 9, insert the word -- between -- after the word "seat" and before the word "an".

Column 16,
Line 1, insert the word -- first -- after the word "said" and before the word "cam".

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,860,469 B2
DATED : March 1, 2005
INVENTOR(S) : Kerg et al.

It is certified that error appears in the above-identified patent and that said Letters Patent is hereby corrected as shown below:

Column 13,
Line 21, delete "6" and insert -- 1 --.
Line 52, delete "a".

Signed and Sealed this

Thirty-first Day of January, 2006

JON W. DUDAS
*Director of the United States Patent and Trademark Office*